US010146811B2

(12) United States Patent
Luo et al.

(10) Patent No.: US 10,146,811 B2
(45) Date of Patent: Dec. 4, 2018

(54) METHOD AND DEVICE FOR PRESENTING APPLICATION PROGRAMS

(71) Applicant: Xiaomi Inc., Beijing (CN)

(72) Inventors: Aibao Luo, Beijing (CN); Liu Fang, Beijing (CN); Yuan Fang, Beijing (CN)

(73) Assignee: Xiaomi Inc., Beijing (CN)

( * ) Notice: Subject to any disclaimer, the term of this patent is extended or adjusted under 35 U.S.C. 154(b) by 430 days.

(21) Appl. No.: 14/873,358

(22) Filed: Oct. 2, 2015

(65) Prior Publication Data
US 2016/0026662 A1 Jan. 28, 2016

Related U.S. Application Data

(63) Continuation of application No. PCT/CN2013/091003, filed on Dec. 31, 2013.

(30) Foreign Application Priority Data

Apr. 25, 2013 (CN) .......................... 2013 1 0147875

(51) Int. Cl.
*G06F 17/30* (2006.01)
*G06Q 30/02* (2012.01)

(52) U.S. Cl.
CPC .. *G06F 17/30312* (2013.01); *G06F 17/30864* (2013.01); *G06F 17/30994* (2013.01); *G06Q 30/0201* (2013.01); *G06Q 30/0282* (2013.01)

(58) Field of Classification Search
CPC ......... G06F 17/30312; G06F 17/30864; G06F 17/30994; G06Q 30/0201; G06Q 30/0282
(Continued)

(56) References Cited

U.S. PATENT DOCUMENTS 7,111,003 B2    9/2006  Blaicher
7,565,610 B2 *  7/2009  Li .......................... H04L 41/22
                                                          715/733
(Continued)

FOREIGN PATENT DOCUMENTS

CN    101887390 A    11/2010
CN    102360364 A    2/2012
(Continued)

OTHER PUBLICATIONS

International Search Report dated Apr. 3, 2014, in counterpart International Application No. PCT/CN2013/091003.
(Continued)

*Primary Examiner* — Vincent F Boccio
(74) *Attorney, Agent, or Firm* — Finnegan, Henderson, Farabow, Garrett & Dunner LLP (57) ABSTRACT

A method for presenting a plurality of application programs for use in a device, includes: acquiring, for each of the plurality of application programs, at least two parameter factors indicating application information about the application program within a set time period; determining, for each of the plurality of application programs, a sorting factor based on the at least two parameter factors acquired for the application program; and sorting the plurality of application programs according to the sorting factors of the application programs, respectively, and presenting the sorted application programs.

14 Claims, 7 Drawing Sheets

(58) Field of Classification Search
USPC .................................. 707/748, 750, 752, 753
See application file for complete search history.

(56) References Cited

U.S. PATENT DOCUMENTS

| | | | | |
|---|---|---|---|---|
| 8,140,541 B2* | 3/2012 | Koss | ...................... | G06Q 10/04 707/748 |
| 8,370,336 B2* | 2/2013 | Dumon | ............. | G06F 17/30979 707/723 |
| 8,719,273 B2* | 5/2014 | Softky | .............. | G06F 17/30631 707/662 |
| 2008/0104521 A1* | 5/2008 | Dubinko | ........... | G06F 17/30867 707/999.003 |
| 2010/0262596 A1* | 10/2010 | Dumon | ............. | G06F 17/30979 707/723 |
| 2013/0138503 A1* | 5/2013 | Brown | ............... | G06Q 30/0246 705/14.45 |
| 2014/0123124 A1* | 5/2014 | Gray | ....................... | G06F 8/665 717/170 |

FOREIGN PATENT DOCUMENTS

| | | |
|---|---|---|
| CN | 102799635 A | 11/2012 |
| CN | 103049452 A | 4/2013 |
| CN | 103235815 A | 8/2013 |
| JP | 2002-123533 A | 4/2002 |
| JP | 2009-545809 A | 12/2009 |
| RU | 2010 111 737 A | 10/2011 |

OTHER PUBLICATIONS

"Establishment of Download Half-Life of Scientific and Technical Journals and Its Bibliometrics Significance," Xueli Liu, Chinese Journal of Scientific and Technical Periodical Research, 2012, 23 (4): 561-564, dated Jan. 19, 2012.

"Trimmed Average Used in When It Varies Greatly Between the Upper and Lower Limit," Sakai Takashi, dated Jan. 30, 2012.

* cited by examiner

METHOD AND DEVICE FOR PRESENTING
APPLICATION PROGRAMS

CROSS-REFERENCE TO RELATED
APPLICATIONS

This application is a Continuation Application of International Application PCT/CN2013/091003, filed Dec. 31, 2013, which is based on and claims priority to Chinese Patent Application No. 201310147875.X, filed Apr. 25, 2013, the entire contents of all of which are incorporated herein by reference.

TECHNICAL FIELD

The present disclosure generally relates to the field of Internet information technologies and, more particularly, to a method and a device for presenting application programs.

BACKGROUND

With the development of Internet technologies, various application programs, e.g., office programs, player programs, and so on, are available for downloading from the Internet. However, when there are multiple application programs with a same usage available for downloading from the Internet, a user may not know which application program to choose and download.

In order to facilitate choosing a needed application program by the user, Internet operators generally present application programs according to a preset order.

SUMMARY

According to a first aspect of the present disclosure, there is provided a method for presenting a plurality of application programs for use in a device, comprising: acquiring, for each of the plurality of application programs, at least two parameter factors indicating application information about the application program within a set time period; determining, for each of the plurality of application programs, a sorting factor based on the at least two parameter factors acquired for the application program; and sorting the plurality of application programs according to the sorting factors of the application programs, respectively, and presenting the sorted application programs.

According to a second aspect of the present disclosure, there is provided a device for presenting a plurality of application programs, comprising: a processor; and a memory for storing instructions executable by the processor; wherein the processor is configured to: acquire, for each of the plurality of application programs, at least two parameter factors indicating application information about the application program within a set time period; determine, for each of the plurality of application programs, a sorting factor based on the at least two parameter factors acquired for the application program: and sort the plurality of application programs according to the sorting factors of the application programs, respectively, and present the sorted application programs.

According to a third aspect of the present disclosure, there is provided a non-transitory computer-readable storage medium having stored therein instructions that, when executed by a processor of a device, causes the device to perform a method for presenting a plurality of application programs, the method comprising: acquiring, for each of the plurality of application programs, at least two parameter factors indicating application information about the application program within a set time period; determining, for each of the plurality of application programs, a sorting factor based on the at least two parameter factors acquired for the application program; and sorting the plurality of application programs according to the sorting factors of the application programs, respectively, and presenting the sorted application programs.

It will be appreciated that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
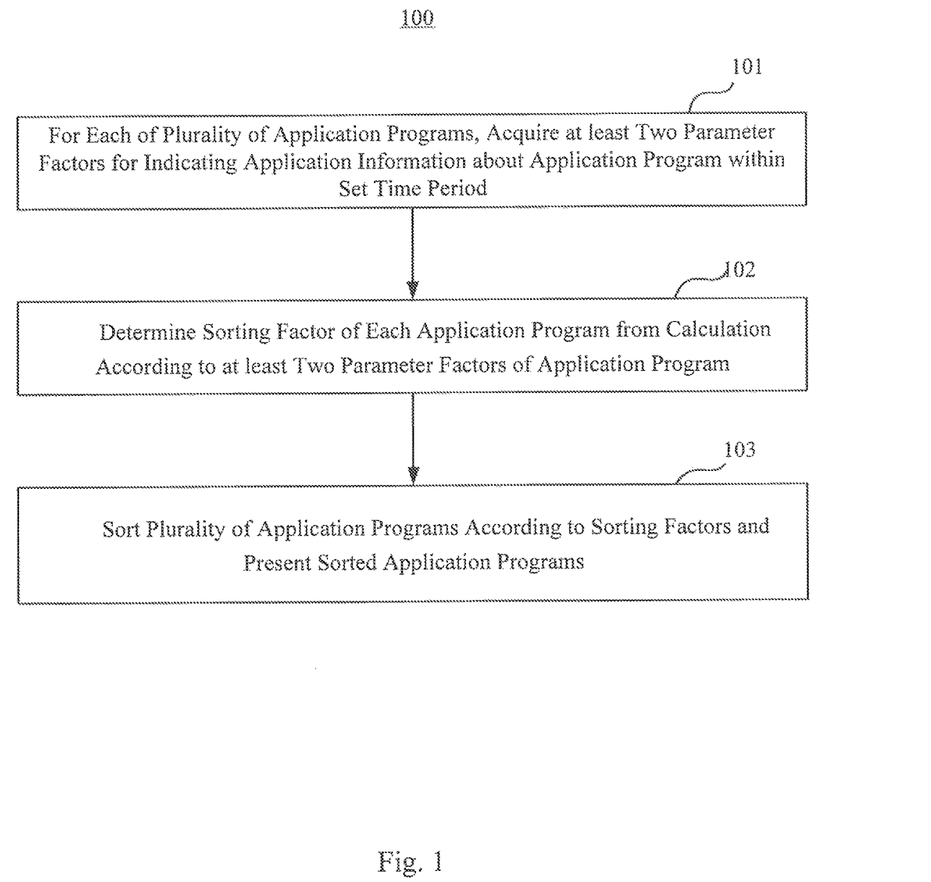
FIG. 1 is a flowchart of a method for presenting a plurality of application programs, according to an exemplary embodiment.

FIG. 1 is a flowchart of a method 100 for presenting a plurality of application programs, according to an exemplary embodiment. For example, the method 100 may be used in a server or a terminal device. Referring to FIG. 1, the method 100 includes the following steps.

In step 101, for each of the plurality of application programs, at least two parameter factors for indicating application information about the application program within a set time period are acquired.

In the exemplary embodiment, to present the application programs that can best meet user needs, the application programs are sorted before presenting to the user. Therefore, the at least two parameter factors for indicating application information about each of the application programs within the set time period are acquired from a background database corresponding to the application programs to be sorted.

In exemplary embodiments, the set time period may be a time period determined according to a life cycle of an application program or a time period acquired from experimental results, such as one month, one quarter and the like, or a time period set in days (e.g., N days) or in hours and the like.

In exemplary embodiments, the application information about an application program includes downloading information and use information of the application program.

In exemplary embodiments, the at least two parameter factors for indicating application information are acquired within the set time period right before a current time point. For example, if the set time period is one month, the at least two parameter factors for indicating application information within one past month from the current time point are acquired.

In exemplary embodiments, for each of the plurality of application programs, a download count factor for indicating a number of times of the application program being downloaded and a scoring factor for indicating use information of the application program are acquired.

In one exemplary embodiment, to acquire the download count factor of an application program, a download count value of the application program within the set time period is acquired, and a half-life processing of the download count value is performed according to a half-life principle involving the download count factor of the application program, thus obtaining the download count factor for indicating application information about the application program within the set time period.

In the exemplary embodiment, the download count factor of the application program may be influenced in such a manner of the half-life principle that a value corresponding to the download count factor may tend to be stable as time goes on. Therefore, after acquiring the download count value of the application program within the set time period, a half-life processing of the download count value is performed according to the half-life principle of the download count factor of the application program. Alternatively and/or additionally, a half-life factor of the download count factor of the application program within the set time period is determined according to a corresponding relationship between a time factor and the half-life factor of the download count factor of the application program, so as to adjust the download count value by using the determined half-life factor.

For example, supposing that the half-life factor of the download count factor of the application program within the set time period (T) is $(½)^T$ and the download count value of the application program within the set time period is D, the half-life processing of the download count value may be performed according to the half-life principle of the download count factor of the application program, so as to obtain the download count factor $D*(½)^T$ for indicating application information about the application program within the set time period.

In one exemplary embodiment, to acquire the scoring factor of an application program, statistics are determined to obtain score values of the application program within the set time period, and the score values obtained from the statistics are adjusted according to a preset score threshold, thus obtaining the scoring factor for indicating application information about the application program within the set time period. The preset score threshold may be determined according to an actual need or be determined according to experimental results, which is not limited herein.

In step 102, a sorting factor of each of the plurality of application programs is determined from a calculation according to the at least two parameter factors of the application program.

In one exemplary embodiment, after the at least two parameter factors of an application program are acquired, a multiplication of the at least two parameter factors is performed and the value obtained is taken as a sorting factor of the application program.

In step 103, the plurality of application programs are sorted according to the sorting factors of the application programs, respectively, and the sorted application programs are presented to a user.

In one exemplary embodiment, after the sorting factors are determined for all of the plurality of application programs, respectively, the determined sorting factors are sorted in a descending order of their numeric values.

In one exemplary embodiment, after the sorting factor of an application program to be sorted is determined, the sorting factor is compared with sorting factors of other application programs that have been sorted. Based on the comparative results, a sort order of the application program to be sorted in the sorted application programs is determined, and the application program to be sorted is inserted according to the determined sort order. As the above process is repeated, all of the plurality of application programs are sorted.

In exemplary embodiments, identification information of each of the plurality of application programs sorted are presented according to the sort order.

By using the method 100, the plurality of application programs are presented after being sorted according to the sorting factors of the application programs, respectively. The method 100 can not only accurately reflect the practicality of application programs within the set time period, but also improve user efficiency in selecting an application program to download.

Figure 2:
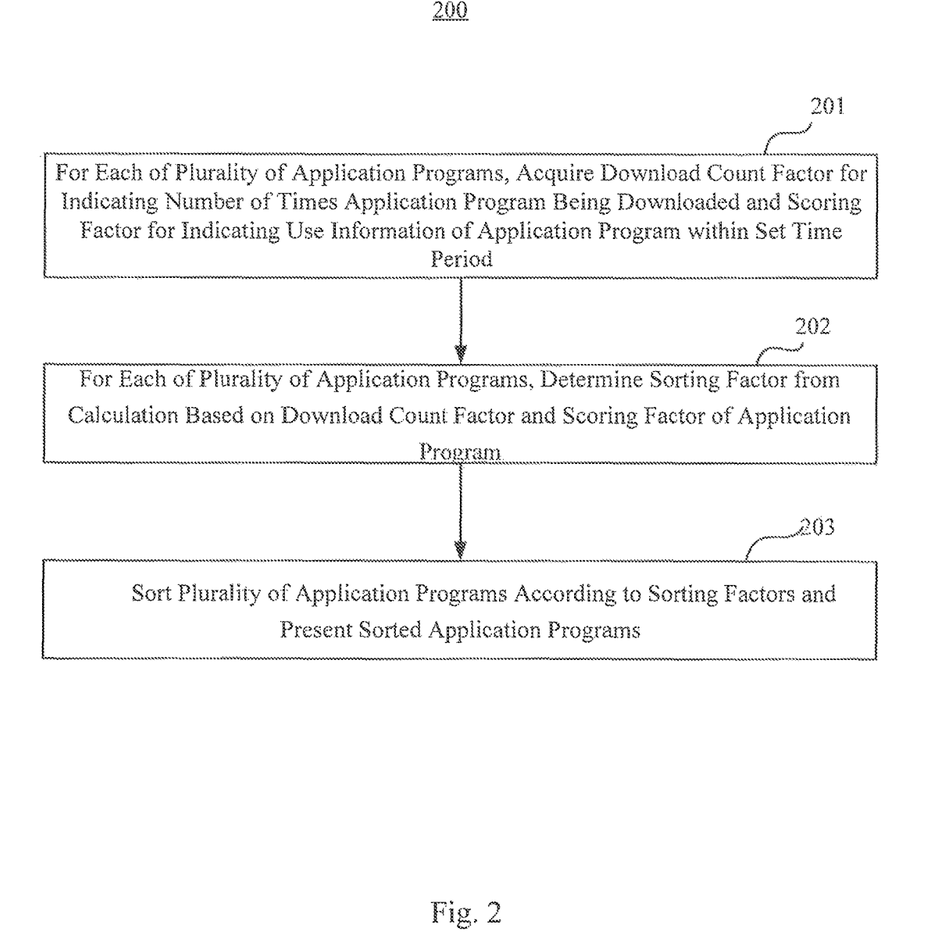
FIG. 2 is a flowchart of a method for presenting a plurality of application programs, according to an exemplary embodiment.

FIG. 2 is a flowchart of a method 200 for presenting a plurality of application programs, according to an exemplary embodiment. For example, the method 200 may be used in a server or a terminal device. Referring to FIG. 2, the method 200 includes the following steps.

In step 201, for each of a plurality of application programs, a download count factor for indicating a number of times of the application program being downloaded and a scoring factor for indicating use information of the application program within a set time period are acquired.

Firstly, a download count value of the application program within the set time period is acquired.

In exemplary embodiments, the set time period is divided into a plurality of time slots and a download count value of the application program is determined within each time slot. In one exemplary embodiment, the set time period is divided into a plurality of time slots with a same time span (for example, 24 hours for each time slot). In another embodiment, the set time period is divided into a plurality of time slots with different time spans (for example, 6 hours for one time slot, and 12 hours for another time slot, and the like).

For example, if the set time period is one past month (e.g., 30 days), the set time period may be divided into 30 time slots (starting from a current time point, every 24 hours is regarded as a time slot), and the download count value of the application program within each time slot may be determined as: $d_1, d_2, \ldots d_i, \ldots d_{30}$, wherein $d_1$ is the download count value of the application program within the first 24 hours from the current time point, and $d_i$ is the download count value of the application program within the $i^{th}$ 24 hours from the current time point.

In the exemplary embodiments, the download count value for an application program is acquired from different users downloading the application program. For example, when a same user downloads the application program multiple times, the download count value corresponding to the user's multiple times of downloading is only once. In this way, an accurate recommendation of the application program can be achieved even when the application program is downloaded multiple times by the same user maliciously.

In exemplary embodiments, statistics are determined to obtain the download count value and a download address of an application program within each divided time slot, and the download count value obtained from the statistics is adjusted according to the download address, thus obtaining the download count value of the application program within each divided time slot.

In exemplary embodiments, the download count value of an application program may be influenced by the download address. For example, the application program may be acquired from a website address provided by the application program publisher or from other equipment onto which the application program has been downloaded. The download count value of the application program may be truly indicated by acquiring the download count value of the application program from the website address provided by the application program publisher. However, the download count value of the application program may be indicated indirectly by acquiring the download count value of the application program from other equipment onto which the application program has been downloaded, which may possibly involve repeated downloading and thus may not accurately reflect the download count value. Therefore, the statistics may be determined with respect to both the download count value and the download address of the application program within each divided time slot.

In exemplary embodiments, according to a corresponding relationship between a download address and a download count value adjustment parameter, the download count value adjustment parameter corresponding to the download address is determined, so as to adjust a download count value acquired from the statistics by using the determined download count value adjustment parameter, thus acquiring a download count value of the application program within each divided time slot. For example, a download count value adjustment parameter corresponding to a direct download address is greater than a download count value adjustment parameter corresponding to an indirect download address.

In exemplary embodiments, factors influencing the download count value adjustment parameter include but are not limited to: a quantity of application programs presented on a single web page, a searching sequence of application programs by users, and so on.

Secondly, a half-life processing of the download count value is performed according to a half-life principle of the download count factor of the application program, thus obtaining the download count factor for indicating application information about the application program within the set time period. For example, this can be implemented using the following first, second, and third steps.

In the first step, a half-life value of the application program corresponding to each time slot is determined. For example, the half-life value of the application program corresponding to an $i^{th}$ time slot is determined according to the formula $(1/2)^{(i/T)}$, wherein T represents a half-life cycle.

In the second step, a download count factor of the application program within each time slot is determined from a calculation based on the determined download count value of the application program within each time slot and the half-life value of the application program corresponding to each time slot.

For example, if it is determined that the download count value of the application program within the $i^{th}$ time slot is Di and the half-life value of the application program corresponding to the $i^{th}$ time slot is $(1/2)^{(i/T)}$, the download count factor of the application program within the $i^{th}$ time slot is $Di*(1/2)^{(i/T)}$.

In the third step, the download count factor for indicating application information about the application program within the set time period is obtained according to the download count factor of the application program within each time slot determined from the calculation.

For example, the download count factor for indicating application information about the application program within the set time period may be determined using the following formula:

$$D(A) = \sum_{i=1}^{m}\left(d_i * \left(\frac{1}{2}\right)^{\left(\frac{i}{T}\right)}\right),$$

wherein "D(A)" represents the download count factor of the application program A within the set time period, "m" represents a length of the set time period, "$d_i$" represents the download count value of the application program within the $i^{th}$ time slot, "T" represents the half-life cycle of the download count factor of the application program, and "i" represents the number (ranging from 1 to m) of time slots divided from the current time point.

In the exemplary embodiment, the download count value of an application program meets the half-life effect principle, and half-life cycles of the download counts of application programs may vary depending on different application scenarios. For example, some application programs may have a half-life cycle of 1, while some other application programs may have a half-life cycle of 2. Therefore, T may be determined according to application scenarios.

Figure 3:
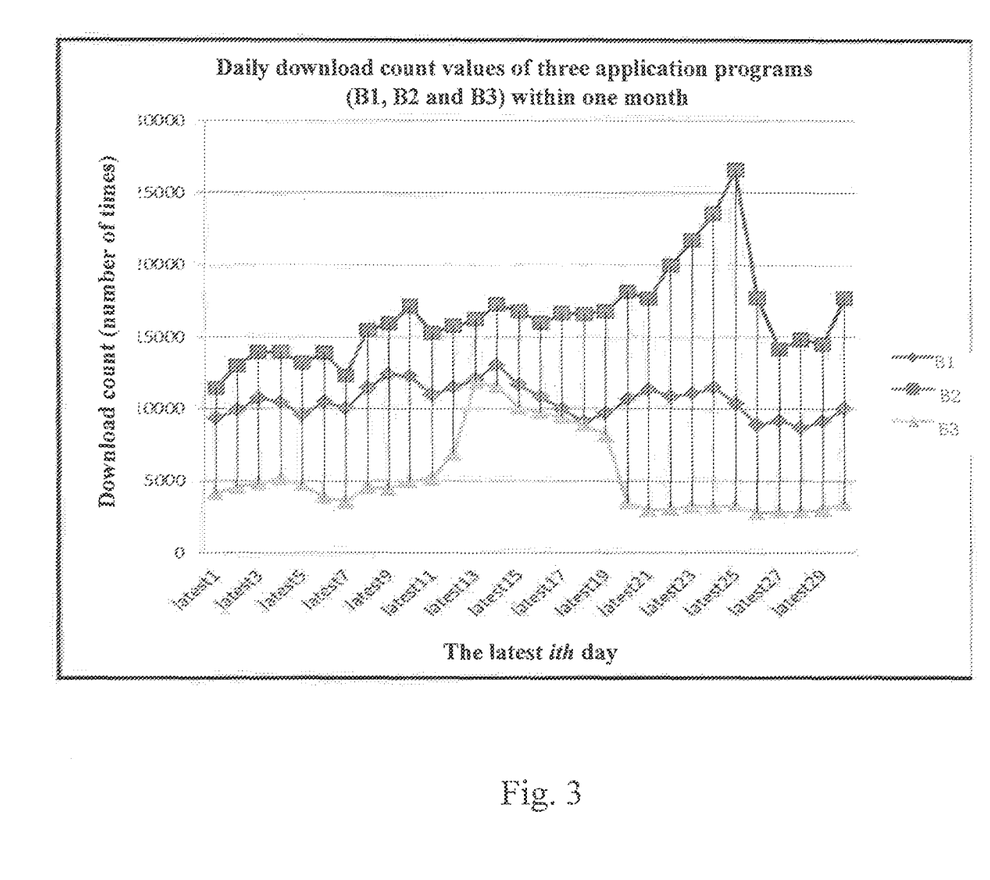
FIG. 3 is a diagram showing daily download count values of three application programs, according to an exemplary embodiment.

For example, FIG. 3 is a diagram showing daily download count values of three application programs (B1, B2, and B3) within a latest month (e.g., 30 days) from a current time point, according to an exemplary embodiment. The download count values reflect a number of times of the application program being downloaded.

In exemplary embodiments, statistics are determined to obtain score values of the application program within the set time period, and the score values obtained from the statistics are adjusted according to a preset score threshold, thereby obtaining the scoring factor for indicating application information about the application program within the set time period. For example, this can be implemented using the following first, second, and third steps.

In the first step, score values of the application program fed back by users within the set time period are received, and an average value of the score values of the application program within the set time period is determined from a calculation according to the received score values.

For example, score values $(Z_1, Z_2, \ldots, Z_n)$ of the application program are fed back by users within the set time period (e.g., 30 days), and the average value of the score values of the application program within the set time period is calculated as follows: $[Z1+Z2+\ldots+Zn]/n$, wherein n=30.

In the exemplary embodiments, the score values of the application program are acquired from different users. For example, when a same user evaluates the application program multiple times, one of the score values from the user or a comprehensive value of the score values from the user is used as a feedback score value of the application program. In this way, an accurate recommendation of the application program can be achieved even when the application program is scored by a same user multiple times maliciously.

In the second step, the average value of the score values of the application program within the set time period is adjusted according to a score threshold of the application program set by default, thus obtaining the scoring factor for indicating use information of the application program within the set time period.

In one exemplary embodiment, a ratio of the average value to the score threshold is taken as the scoring factor for indicating application information about the application program within the set time period.

For example, if the score threshold of the application program set by default is M and the average value of the score values of the application program within the set time period determined from the calculation is R, then the scoring factor for indicating application information about the application program within the set time period is R/M.

In exemplary embodiments, the scoring factor for indicating use information of the application program within the set time period is acquired using the following first, second, and third steps.

In the first step, a reference score threshold is obtained by adjusting the score threshold of the application program set by default according to a preset coefficient. For example, if the preset coefficient is 0.6, the obtained reference score threshold is 0.6*M.

In the second step, the average value of the score values of the application program within the set time period is compared with the obtained reference score threshold value.

In the third step, the scoring factor for indicating use information of the application program within the set time period is determined according to comparative results.

In one exemplary embodiment, a first preset value is taken as the scoring factor for indicating use information of the application program within the set time period when the average value is not less than the reference score threshold value, and the ratio of the average value to the score threshold is taken as the scoring factor for indicating use information of the application program within the set time period when the average value is less than the reference score threshold value. For example, the first preset value may be determined according to an actual need or obtained from experiments.

For example, when the average value R is not less than the reference score threshold value 0.6*M, the scoring factor for indicating use information of the application program within the set time period is determined to be the first preset value. When the average value R is less than the reference score threshold value 0.6*M, the scoring factor for indicating use condition of the application program within the set time period is determined to be R/M.

By adjusting the acquired score values of the application program in the way described above, the scoring factor may accurately reflect users' feedback on the application program.

In exemplary embodiments, a scoring factor function $f(M, R)$ is established, to determine the scoring factor for indicating use information of the application program within the set time period, as follows: $P(A)=f(M, R)$, where "P(A)" represents the scoring factor of application program A within the set time period, "M" represents the score threshold of the application program set by default, and "R" represents the average value of score values of the application program, and $f(M, R)=R/M$ or $$f(M, R) = \begin{cases} 1, & (R \geq 0.6*M) \\ R/M, & (R < 0.6*M) \end{cases},$$

It should be noted that the scoring factor function $f(M, R)$ is not limited to the above two forms.

Figure 4:
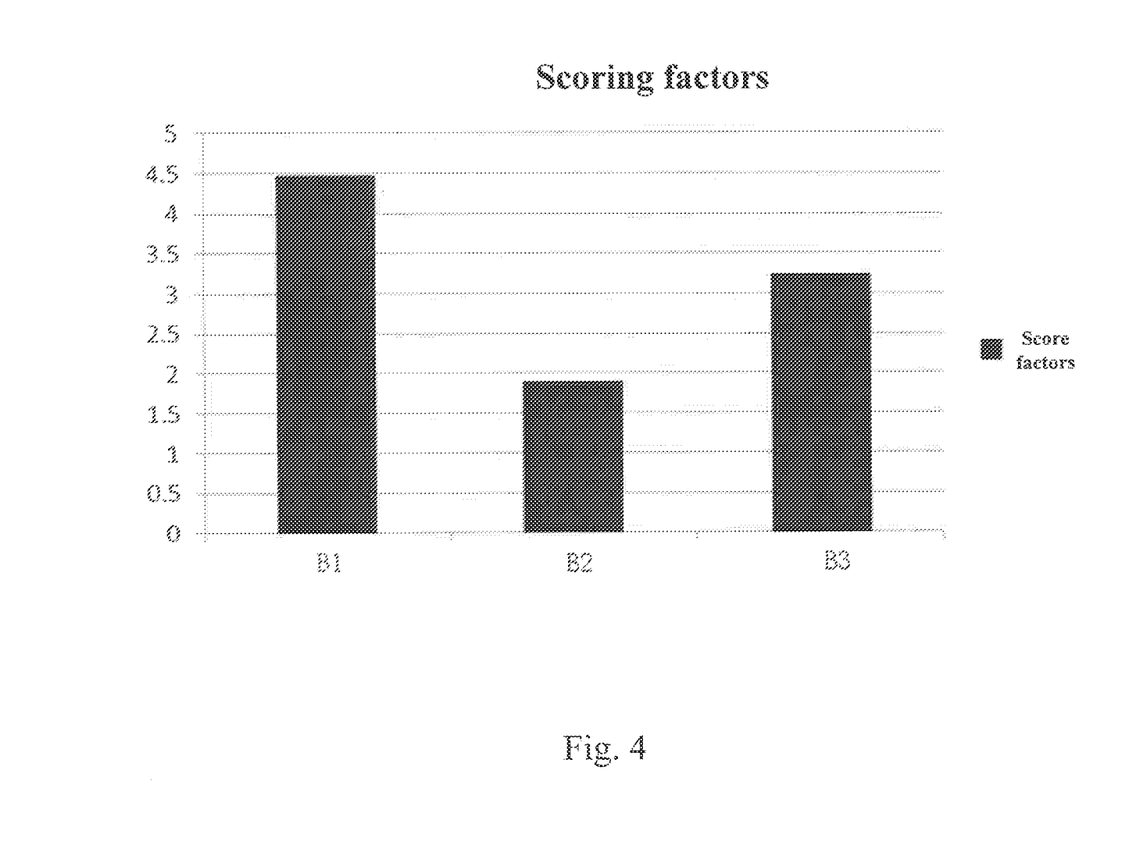
FIG. 4 is a diagram showing scoring factors of three application programs within a set time period, according to an exemplary embodiment.

For example, FIG. 4 is a diagram showing scoring factors of three application programs (B1, B2, and B3) within a set time period, according to an exemplary embodiment. In this embodiment, M is a positive number larger than 0 and smaller than 5.

Referring back to FIG. 2, in step 202, for each of the plurality of application programs, a sorting factor is determined from a calculation based on the download count factor and the scoring factor of the application program.

In one exemplary embodiment, a multiplication of the download count factor and the scoring factor is performed to obtain the sorting factor of the application program. That is, the sorting factor of an application program A is determined using the following formula: $S(A)=D(A)*P(A)$, where "S(A)" represents the sorting factor of the application program A, "D(A)" represents the download count factor of the application program A within the set time period, and "P(A)" represents the scoring factor of the application program A within the set time period.

In step 203, the plurality of application programs are sorted according to their sorting factors and the sorted application programs are presented to a user.

In one exemplary embodiment, the application programs are sorted according to a descending order of their sorting factors.

Figure 5:
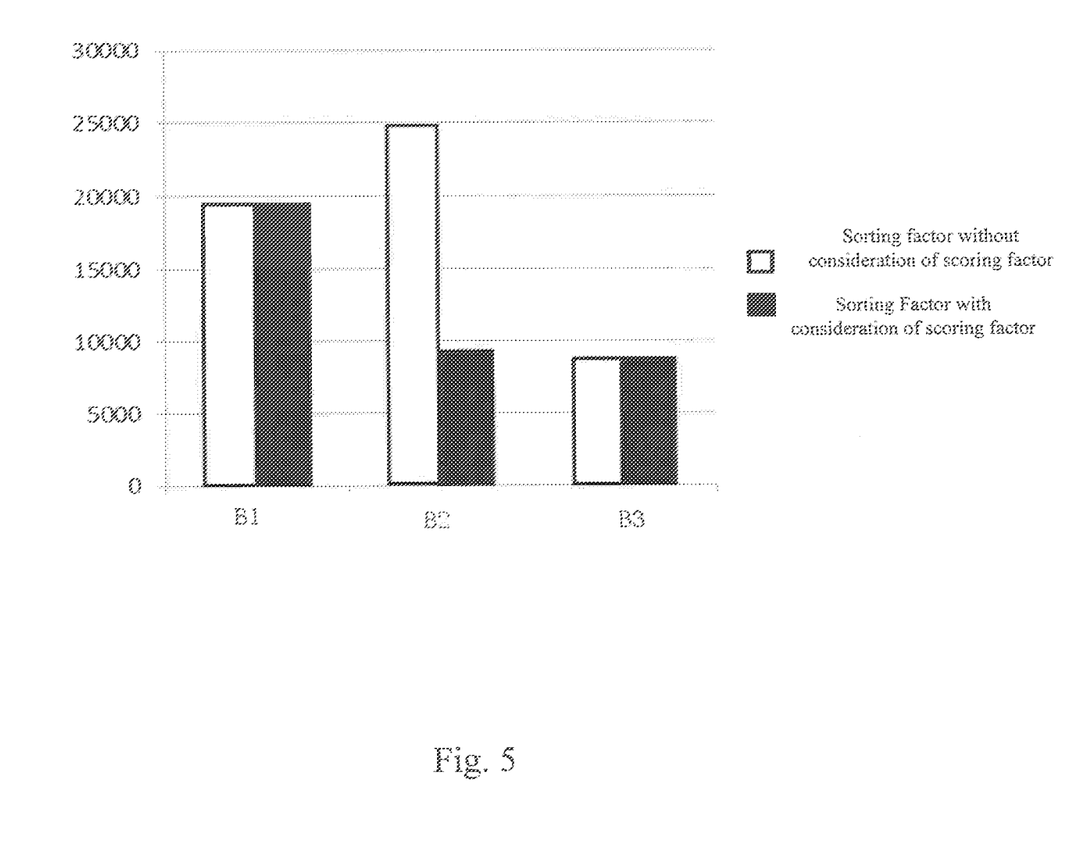
FIG. 5 is a diagram showing different sorting factors obtained for three application programs, according to an exemplary embodiment.

For example, FIG. 5 is a diagram showing different sorting factors obtained for three application programs (B1, B2, and B3) with and without consideration of the scoring factors of the application programs, respectively, according to an exemplary embodiment.

Figure 6:
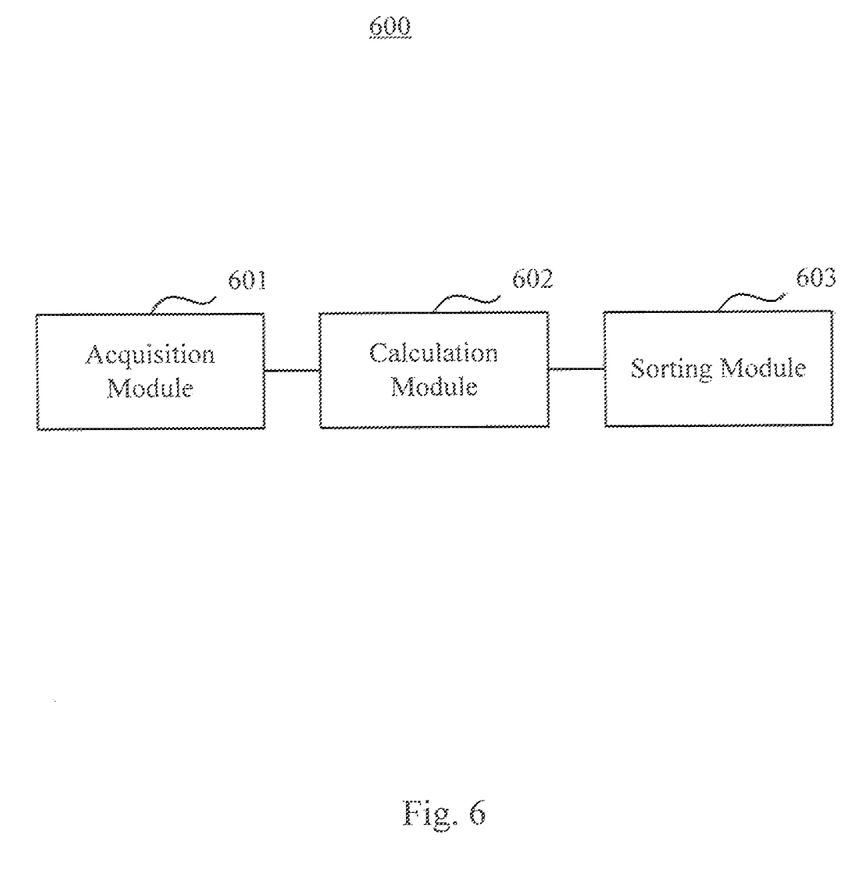
FIG. 6 is a block diagram of a device for presenting a plurality of application programs, according to an exemplary embodiment.

FIG. 6 is a block diagram of a device 600 for presenting a plurality of application programs, according to an exemplary embodiment. For example, the device 600 may be a part of a server or the whole server. Also for example, the device 600 may be a part of a terminal device or the whole terminal device. Referring to FIG. 6, the device 600 includes an acquisition module 601, a calculation module 602, and a sorting module 603.

The acquisition module 601 is configured to acquire, for each of the plurality of application programs, at least two parameter factors indicating application information about the application program within a set time period.

The calculation module 602 is configured to determine a sorting factor for each of the application programs by a calculation based on the at least two parameter factors acquired for the application program.

The sorting module 603 is configured to sort the plurality of application programs according to the sorting factors of the application programs, respectively, and present the sorted application programs.

In exemplary embodiments, the at least two parameter factors include a download count factor. Accordingly, the acquisition module 601 is further configured to acquire a download count value of the application program within the set time period, and perform a half-life processing of the download count value according to a half-life principle involving the download count factor of the application program, to obtain the download count factor indicating the application information about the application program within the set time period.

In exemplary embodiments, the acquisition module 601 is further configured to divide the set time period into a plurality of time slots and determine a download count value of the application program within each time slot, and to determine a half-life value of the application program corresponding to each time slot. The acquisition module 601 is also configured to obtain a download count factor of the application program within each time slot by a calculation based on the determined download count value of the application program within each time slot and a half-life value of the application program corresponding to each time slot, and to obtain the download count factor indicating the application information of the application program within the set time period according to the download count factor of the application program within each time slot.

In exemplary embodiments, the acquisition module 601 is further configured to determine statistics to obtain the download count value and a download address of the application program within each time slot, and adjust the download count value obtained from the statistics according to the download address obtained from the statistics, to obtain the download count value of the application program within each time slot.

In exemplary embodiments, the at least two parameter factors include a scoring factor. Accordingly, the acquisition module 601 is further configured to determine statistics to obtain score values of the application program within the set time period, and adjust the score values obtained from the statistics according to a preset score threshold, to obtain the scoring factor indicating the application information about the application program within the set time period.

In exemplary embodiments, the acquisition module 601 is further configured to receive the score values of the application program fed back from users within the set time period, and determine an average value of the score values of the application program within the set time period by a calculation based on the received score values, and to adjust the average value according to the preset score threshold of the application program, to obtain the scoring factor indicating the application information about the application program within the set time period.

In exemplary embodiments, the acquisition module 601 is further configured to determine a ratio of the average value to the score threshold value as the scoring factor indicating the application information about the application program within the set time period.

In exemplary embodiments, the acquisition module 601 is further configured to obtain a reference score threshold by adjusting the preset score threshold of the application program according to a preset coefficient, to compare the average value with the obtained reference score threshold, and to determine a first preset value as the scoring factor indicating the application information about the application program within the set time period when the average value is not less than the reference score threshold, and determine the ratio of the average value to the score threshold value as the scoring factor indicating the application information about the application program within the set time period when the average value is less than the reference score threshold.

In exemplary embodiments, the sorting module 603 is further configured to perform a multiplication of the at least two parameter factors to obtain the sorting factor of the application program.

In exemplary embodiments, the sorting module 603 is further configured to sort the plurality of application programs according to a descending order of the sorting factors of the application programs.

Figure 7:
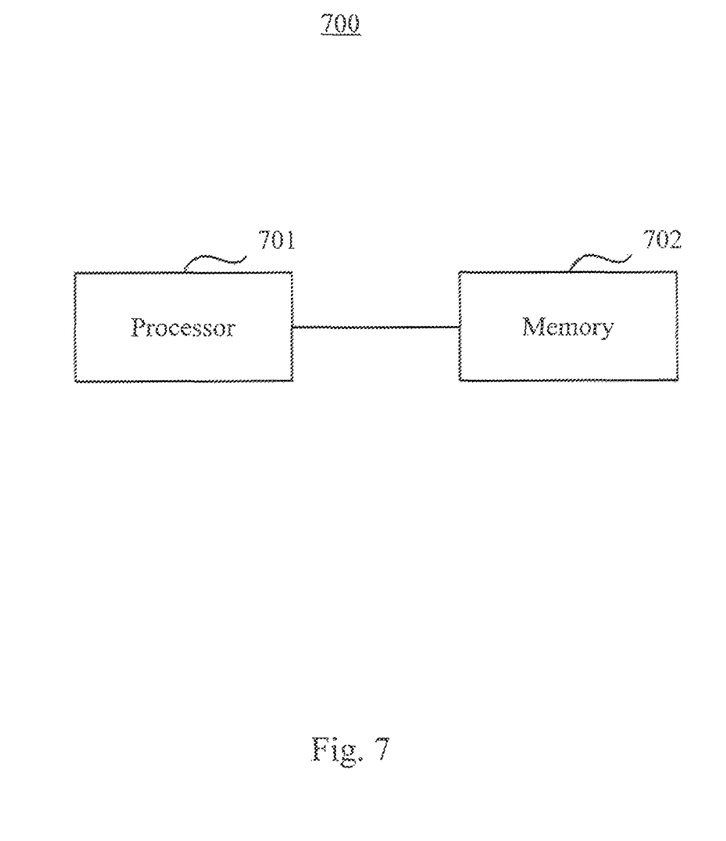
FIG. 7 is a block diagram of a device for presenting a plurality of application programs, according to an exemplary embodiment.

FIG. 7 is a block diagram of a device 700 for presenting a plurality of application programs, according to an exemplary embodiment. For example, the device 700 may be a part of a server or the whole server. Also for example, the device 700 may be a part of a terminal device or the whole terminal device. Referring to FIG. 7, the device 700 includes a processor 701 configured to execute instructions to perform the above described methods, and memory resources represented by a memory 702, for storing the instructions and otherwise facilitating operation of the processor 701.

In exemplary embodiments, there is also provided a non-transitory computer readable storage medium including instructions, such as included in the memory 702, executable by the processor 701 in the device 700, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure should only be limited by the appended claims.

What is claimed is:

1. A method for presenting a plurality of application programs for use in a device, comprising:
   acquiring, for each of the plurality of application programs, at least two parameter factors indicating application information about the application program within a set time period;
   determining, for each of the plurality of application programs, a sorting factor based on the at least two parameter factors acquired for the application program; and sorting the plurality of application programs according to the sorting factors of the application programs, respectively, and presenting the sorted application programs, wherein when the at least two parameter factors include a download count factor, the acquiring comprises:
dividing the set time period into a plurality of time slots and determining a download count value of the application program within each of the time slots;
determining a half-life value of the application program corresponding to each of the time slots;
determining a download count factor of the application program within each of the time slots by a calculation based on the determined download count value of the application program within the time slot and the half-life value of the application program corresponding to the time slot; and
obtaining the download count factor indicating the application information of the application program within the set time period according to the download count factor of the application program within each of the time slots, and wherein the determining of the download count value of the application program within each of the time slots comprises:
determining statistics to obtain the download count value and a download address of the application program within each of the time slots, the download address being one of a direct download address of a website provided by an application program publisher or an indirect download address of a piece of equipment onto which the application has been downloaded; and
adjusting the download count value obtained from the statistics according to the download address obtained from the statistics, to obtain the download count value of the application program within each of the time slots.

2. The method according to claim 1, wherein when the at least two parameter factors include a scoring factor, the acquiring comprises:
determining statistics to obtain score values of the application program within the set time period; and
adjusting the score values obtained from the statistics according to a preset score threshold, to obtain the scoring factor indicating the application information about the application program within the set time period.

3. The method of claim 2, further comprising:
receiving the score values of the application program fed back from users within the set time period, and determining an average value of the score values of the application program received within the set time period by a calculation; and
adjusting the average value according to the preset score threshold of the application program, to obtain the scoring factor indicating the application information about the application program within the set time period.

4. The method of claim 3, wherein the adjusting of the average value comprises:
determining a ratio of the average value to the score threshold as the scoring factor indicating the application information about the application program within the set time period.

5. The method of claim 3, wherein the adjusting of the average value comprises:
obtaining a reference score threshold by adjusting the preset score threshold of the application program according to a preset coefficient;
comparing the average value with the obtained reference score threshold; and
determining a first preset value as the scoring factor indicating the application information about the application program within the set time period when the average value is not less than the reference score threshold, and determining the ratio of the average value to the score threshold as the scoring factor indicating the application information about the application program within the set time period when the average value is less than the reference score threshold.

6. The method of claim 1, wherein the determining of the sorting factor of the application program comprises:
performing a multiplication of the at least two parameter factors to obtain the sorting factor of the application program.

7. The method of claim 6, wherein the sorting of the plurality application programs comprises:
sorting the plurality of application programs according to a descending order of the sorting factors of the application programs, respectively.

8. A device for presenting a plurality of application programs, comprising:
a processor; and
a memory for storing instructions executable by the processor;
wherein the processor is configured to:
acquire, for each of the plurality of application programs, at least two parameter factors indicating application information about the application program within a set time period;
determine, for each of the plurality of application programs, a sorting factor based on the at least two parameter factors acquired for the application program; and
sort the plurality of application programs according to the sorting factors of the application programs, respectively, and present the sorted application programs, wherein when the least two parameter factors include a download count factor, in acquiring the at least two parameter factors, the processor is further configured to:
divide the set time period into a plurality of time slots and determine a download count value of the application program within each of the time slots;
determine a half-life value of the application program corresponding to each of the time slots;
determine a download count factor of the application program within each of the time slots by a calculation based on the determined download count value of the application program within the time slot and the half-life value of the application program corresponding to the time slot; and
obtain the download count factor indicating the application information of the application program within the set time period according to the download count factor of the application program within each of the time slots, and wherein in determining the download count value of the application program within each of the time slots, the processor is further configured to:
determine statistics to obtain the download count value and a download address of the application program within each of the time slots, the download address being one of a direct download address of a website provided by an application program publisher or an indirect download address of a piece of equipment onto which the application has been downloaded; and adjust the download count value obtained from the statistics according to the download address obtained from the statistics, to obtain the download count value of the application program within each of the time slots.

9. The device according to claim 8, wherein when the at least two parameter factors include a scoring factor, the processor is further configured to:

determine statistics to obtain score values of the application program within the set time period; and adjust the score values obtained from the statistics according to a preset score threshold, to obtain the scoring factor indicating the application information about the application program within the set time period.

10. The device of claim 9, wherein the processor is further configured to:

receive the score values of the application program fed back from users within the set time period, and determine an average value of the score values of the application program received within the set time period by a calculation; and adjust the average value according to the preset score threshold of the application program, to obtain the scoring factor indicating the application information about the application program within the set time period.

11. The device of claim 10, wherein the processor is further configured to:

determine a ratio of the average value to the score threshold as the scoring factor indicating the application information about the application program within the set time period.

12. The device of claim 10, wherein the processor is further configured to:

obtain a reference score threshold by adjusting the preset score threshold of the application program according to a preset coefficient;

compare the average value with the obtained reference score threshold; and determine a first preset value as the scoring factor indicating the application information about the application program within the set time period when the average value is not less than the reference score threshold value, and determine the ratio of the average value to the score threshold as the scoring factor indicating the application information about the application program within the set time period when the average value is less than the reference score threshold.

13. The device of claim 8, wherein the processor is further configured to:

perform a multiplication of the at least two parameter factors to obtain the sorting factor of the application program.

14. A non-transitory computer-readable storage medium having stored therein instructions that, when executed by a processor of a device, causes the device to perform a method for presenting a plurality of application programs, the method comprising:

acquiring, for each of the plurality of application programs, at least two parameter factors indicating application information about the application program within a set time period;

determining, for each of the plurality of application programs, a sorting factor based on the at least two parameter factors acquired for the application program; and sorting the plurality of application programs according to the sorting factors of the application programs, respectively, and presenting the sorted application programs, wherein when the at least two parameter factors include a download count factor, the acquiring comprises:

dividing the set time period into a plurality of time slots and determining a download count value of the application program within each of the time slots;

determining a half-life value of the application program corresponding to each of the time slots;

determining a download count factor of the application program within each of the time slots by a calculation based on the determined download count value of the application program within the time slot and the half-life value of the application program corresponding to the time slot; and obtaining the download count factor indicating the application information of the application program within the set time period according to the download count factor of the application program within each of the time slots, and wherein the determining of the download count value of the application program within each of the time slots comprises:

determining statistics to obtain the download count value and a download address of the application program within each of the time slots, the download address being one of a direct download address of a website provided by an application program publisher or an indirect download address of a piece of equipment onto which the application has been downloaded; and adjusting the download count value obtained from the statistics according to the download address obtained from the statistics, to obtain the download count value of the application program within each of the time slots.

* * * * *